US011200250B2

(12) United States Patent
Sarangi et al.

(10) Patent No.: US 11,200,250 B2
(45) Date of Patent: Dec. 14, 2021

(54) METHOD AND SYSTEM FOR OPTIMIZING VALIDATIONS CARRIED OUT FOR INPUT DATA AT A DATA WAREHOUSE

(71) Applicant: Tata Consultancy Services Limited, Mumbai (IN)

(72) Inventors: Ranjan Kumar Sarangi, Bhubaneswar (IN); Debiprasad Swain, Bhubaneswar (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 5 days.

(21) Appl. No.: 16/698,114

(22) Filed: Nov. 27, 2019

(65) Prior Publication Data
US 2020/0175029 A1 Jun. 4, 2020

(30) Foreign Application Priority Data

Nov. 30, 2018 (IN) .............................. 201821045426

(51) Int. Cl.
*G06F 16/25* (2019.01)
*G06F 16/21* (2019.01)
*G06F 16/28* (2019.01)

(52) U.S. Cl.
CPC .......... *G06F 16/254* (2019.01); *G06F 16/217* (2019.01); *G06F 16/283* (2019.01)

(58) Field of Classification Search
CPC .... G06F 16/248; G06F 16/904; G06F 16/254; G06F 16/217; G06F 16/283
See application file for complete search history.

(56) References Cited

U.S. PATENT DOCUMENTS

| 9,594,780 B1 | 3/2017 | Esposito et al. |
| 10,025,815 B2 | 7/2018 | Jurowicz et al. |
| 10,885,565 B1* | 1/2021 | Russell ............. G06Q 30/0625 |
| 2016/0267082 A1* | 9/2016 | Wong .................... G06F 16/164 |
| 2017/0006135 A1* | 1/2017 | Siebel .................... H04L 69/40 |
| 2017/0011104 A1 | 1/2017 | Hyde et al. |
| 2018/0053401 A1* | 2/2018 | Martin ................ H04L 12/1895 |
| 2019/0312869 A1* | 10/2019 | Han ....................... G06N 5/022 |

FOREIGN PATENT DOCUMENTS

CN 104361433 A 2/2015

* cited by examiner

*Primary Examiner* — Mariela Reyes
*Assistant Examiner* — Courtney Harmon
(74) *Attorney, Agent, or Firm* — Finnegan, Henderson, Farabow, Garrett & Dunner, LLP

(57) ABSTRACT

This disclosure relates generally to a system and method to optimize a plurality of validations in an ETL workflow. The ETL workflow implements all types of validations expecting that there is erroneous data and that the validation would fail. Therefore, the actual execution of validation is made conditional based on a switch that can be turned on (validation is performed) or off (validation is skipped). The output of each instance of execution is recorded continuously at a repository. The means of identifying a specific validation that is eligible for being turned off requires a thorough analysis of all validations performed so far in the history. The thorough analysis includes how many times a validation has been performed on a particular field and to calculate an exposure value which is compared with a threshold value of exposure and determine specific validation that is eligible to be turned off.

8 Claims, 2 Drawing Sheets

METHOD AND SYSTEM FOR OPTIMIZING VALIDATIONS CARRIED OUT FOR INPUT DATA AT A DATA WAREHOUSE

CROSS-REFERENCE TO RELATED APPLICATIONS AND PRIORITY

This U.S. patent application claims priority under 35 U.S.C. § 119 to India Application No. 201821045426, filed on Nov. 30, 2018. The entire contents of the abovementioned application are incorporated herein by reference.

TECHNICAL FIELD

The disclosure herein generally relates to a field of extract, transform and load (ETL) programs and, more particularly, a system and method for optimizing the data validation of input data that are ingested with high volume and velocity in to a data warehouse.

BACKGROUND

Extract Transform and Load (ETL) program port data in high volume & velocity from business transaction arrangements or data bases (usually referred as sources) to a target system or data base called Data warehouse (usually referred as sink). These ETL programs carry out lot of validation for fields and records in the input data. This computation demand lot of resource (CPU, Memory) and time.

The consumption of resources to process or validate input data increases with increase in volume & velocity of incoming data. This increases cost of Computation and adds to the cost of operations for Enterprises. Further, the time taken in validations increases with increase in volume and velocity of incoming data. This increase in time also adds to bad experience for users who are waiting to see result of ETL programs.

SUMMARY

Embodiments of the present disclosure provides technological improvements as solutions to one or more of the abovementioned technical problems recognized by the inventors in conventional systems. For example, in one embodiment, a method and system for optimizing a plurality of validations carried out for input data at a data warehouse.

A method to optimize a plurality of validations which are carried out for input data at a data warehouse. The method comprising one or more steps receiving input data to the warehouse, wherein the input data comprises one or more data files and each file contains a series of similar records with each record having series of fields, each with different characteristics and business meaning. At least one field of the series of fields is selected using a data dictionary of the data warehouse to load the received input data. Further, the method comprises determining an usage of the selected at least one field of the warehouse to determine an impact of the received input data being incorrect, executing one or more instances of a validation of the input data to the at least one selected field of the warehouse, analyzing the output of the executed one or more instances of the validation to determine a probability of failure of each instance of validation using the recorded repository of historical results of execution of one or more instances of validation, calculating an exposure value for each executed instance of validation, wherein the calculated exposure value is product of the probability of failure and Impact the failure of each executed instance of validation, and finally optimizing the plurality of validations carried out for input data at a data warehouse by comparing the exposure value for each executed instance of validation with a predefined threshold value of exposure.

A system is configured for optimizing a plurality of validations carried out for input data at a data warehouse. The system comprising at least one memory storing a plurality of instructions and one or more hardware processors communicatively coupled with the at least one memory. The one or more hardware processors are configured to execute one or more modules comprises of a receiving module, a selection module, a determining module, an execution module, an analyzing module, a calculation module, and an optimizing module.

The receiving module of the system is configured to receive the input data to the warehouse. The selection module configured to select at least one field using a data dictionary of the data warehouse to load the received input data. The determining module configured to determine an usage of the selected at least one field of the warehouse to determine an impact of the received input data being incorrect and an execution module configured to execute one or more instances of a validation of the input data to the at least one selected field of the warehouse, wherein the output of each instance of execution is recorded continuously at a repository. Further, the analyzing module of the system is configured to analyze the output of the executed one or more instances of the validation to determine a probability of failure of each instance of validation using the recorded repository of historical results of execution of one or more instances of validation. The calculation module configured to calculate an exposure value for each executed instance of validation, wherein the calculated exposure value is product of the probability of failure and Impact the failure of each executed instance of validation and finally, the optimizing module of the system is configured to optimize the plurality of validations carried out for input data at a data warehouse using the exposure value for each executed instance of validation with a predefined maximum threshold value of exposure.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a system and method to optimize a plurality of validations, which are carried out for input data at a data warehouse. It would be appreciated that the validation of one or more instances is based on positive result of execution of validations. The means of identifying at least one specific validation that is eligible for being turned off requires a thorough analysis of all validations performed so far in the history. The thorough analysis includes how many times a validation has been performed on a particular field or object. Therefore, these number are predefined based on the business executing the system.

Figure 1:
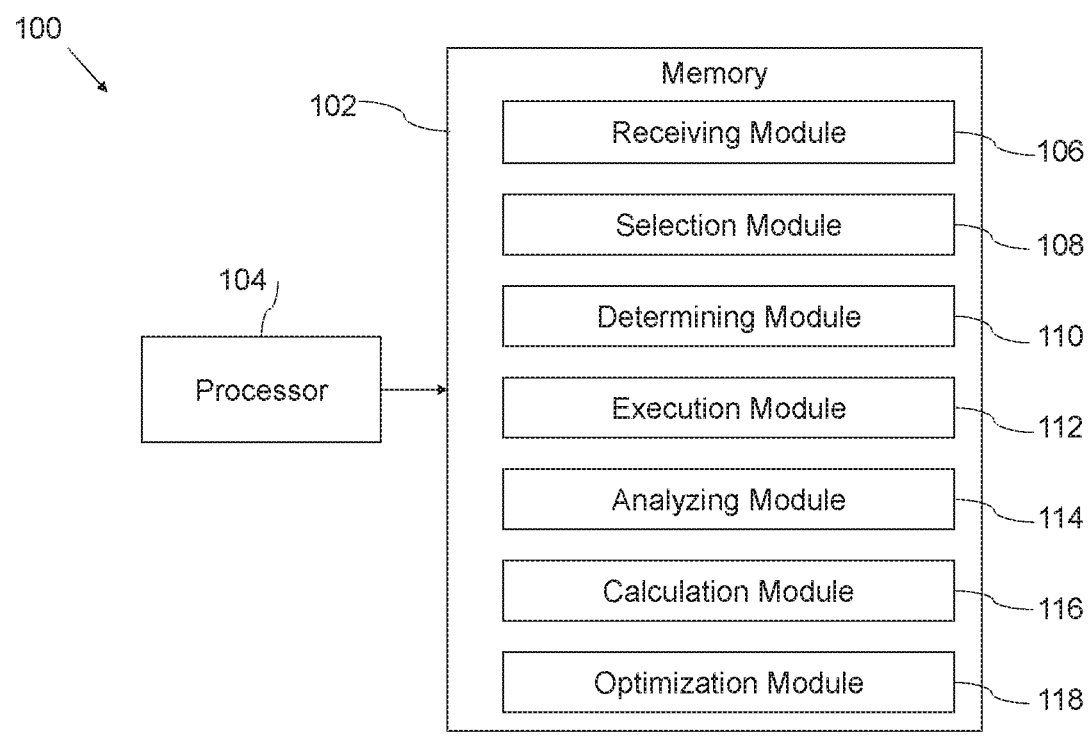
FIG. 1 illustrates a system for optimizing a plurality of validations carried out for input data at a data warehouse, in accordance with some embodiments of the present disclosure.
Figure 2:
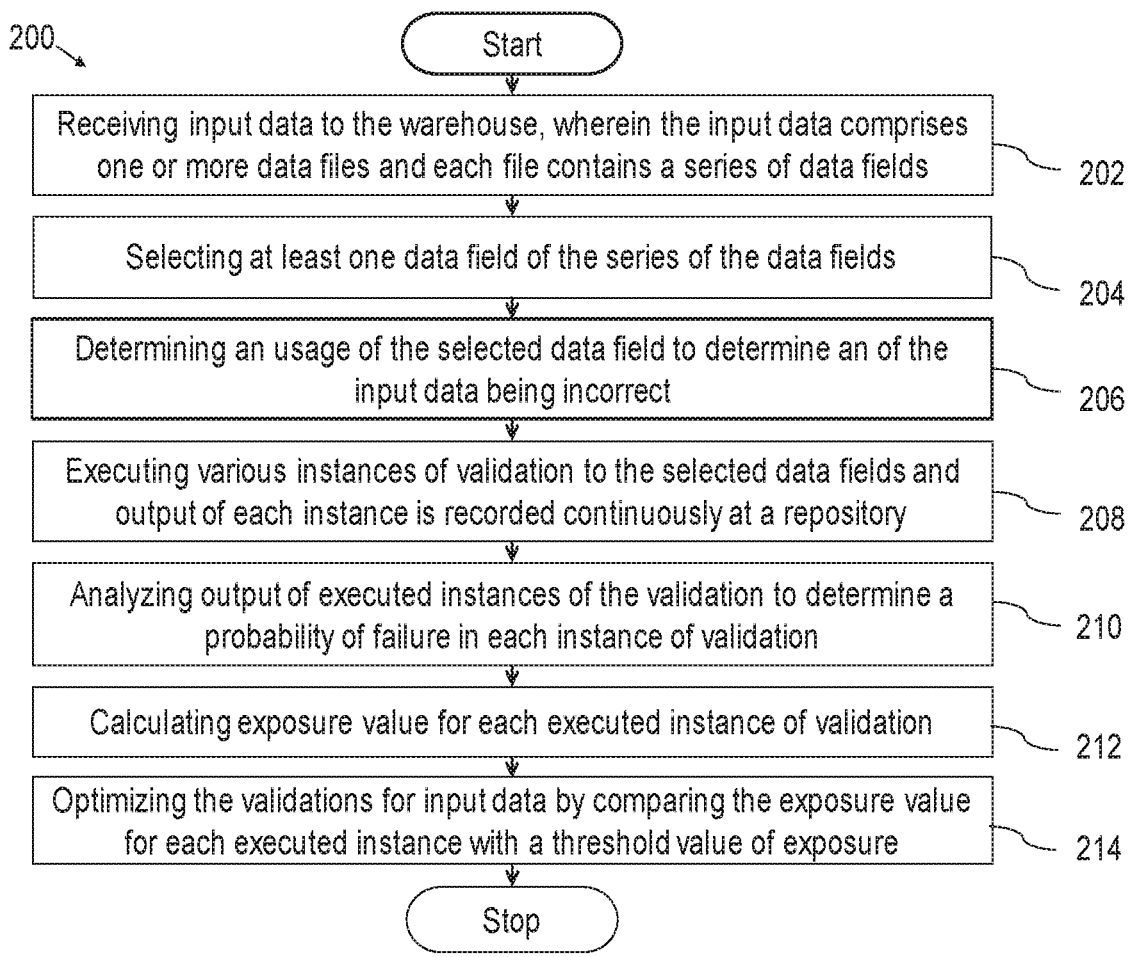
FIG. 2 is a flow diagram to illustrate a method to optimize a plurality of validations carried out for input data at a data warehouse, in accordance with some embodiments of the present disclosure.

Referring now to the drawings, and more particularly to FIG. 1 through FIG. 2, where similar reference characters denote corresponding features consistently throughout the figures, there are shown preferred embodiments and these embodiments are described in the context of the following exemplary system and/or method.

Referring FIG. 1, wherein the system (100) is configured for optimizing a plurality of validations carried out for input data at a data warehouse. It should be appreciated that in an extract, transform, and load (ETL) workflow implements all types of validations expecting that may be there is erroneous data and that the validation would fail. This is based on no-trust on the quality of source or incoming data. Therefore, the actual execution of validation is made conditional based on a switch that can be turned on (validation is performed) or off (validation is skipped). The ETL workflow is allowed to progress with validation switch turned on for a predefined period of time. The output of each instance of execution is recorded continuously at a repository.

In one embodiment, there are three validation types as file level validation, record level validation, and a field level validation. The actual validation nature includes but not limited to the following:
 a) Null check
 b) Data type check (e.g. numeric, data, time, date & time check, Boolean check and so on)
 c) Data value check (a numeric value is within certain range, a code value is one of the allowed list of values, and so on)
 d) Data length check
 e) Data format check
 f) Referential integrity check across entities or across files (e.g, value of customer ID as present in account master file is also present in customer ID in customer master file)
 g) Business logic validations for a record (e.g. a transaction date is later than an account creations date; policy creation date is earlier than the proposal date in case of insurance business where both fields are in same record)
 h) File level validation (e.g. count of records should be matching the value mentioned in header of file; the file name format should follow certain predefined template).

In the preferred embodiment, the system (100) comprises at least one memory (102) with a plurality of instructions and one or more hardware processors (104) which are communicatively coupled with the at least one memory (102) to execute modules therein. Further, the system comprises a receiving module (106), a selection module (108), a determining module (110), an execution module (112), an analyzing module (114), a calculation module (116), and an optimization module (118).

The hardware processor (104) may be implemented as one or more microprocessors, microcomputers, microcontrollers, digital signal processors, central processing units, state machines, logic circuitries and/or any devices that manipulate signals based on operational instructions. Among other capabilities, the hardware processor (104) is configured to fetch and execute computer-readable instructions stored in the memory (102).

In the preferred embodiment of the disclosure, the receiving module (106) of the system (100) is configured to receive the input data to the warehouse. It should be appreciated that the received input data comprising one or more data files and each file comprises a series of data fields. Further herein, the each data file of the received input data is different in its characteristics and business meaning with other files.

In the preferred embodiment of the disclosure, the selection module (108) of the system (100) is configured to select at least one data field out of the series of data fields of the received input data using a data dictionary of the data warehouse to load the received input data. In one example, the customer information file has data fields as customer ID, First Name, Last Name, Gender, Physical Address, Communication Address, Profession, Balance Due Amount and Black List Flag. The selection module may select customer ID, First Name and Last Name as data fields for validation.

In the preferred embodiment of the disclosure, the determining module (110) of the system (100) is configured to determine the usage of the selected at least one data field of the warehouse to determine an impact of the received input data being incorrect.

In another example, a customer information file comes in, with about hundred records inside it, to a data warehouse system every day. The customer information file has data fields as customer ID, First Name, Last Name, Gender, Physical Address, Communication Address, Profession, Balance Due Amount and Black List Flag. Since there are hundred records, the data field "First Name" goes through hundred instances of validation every day (i.e. assuming that the ETL workflow execution happens daily). Then over a year (365 days) the system would have 100*365 validations being performed for just one data field "First Name".

In the preferred embodiment of the disclosure, the execution module (112) of the system (100) is configured to execute one or more instances of a validation of the input data to the at least one selected data field of the warehouse, wherein the output of each instance of execution is recorded continuously at a repository.

In the preferred embodiment of the disclosure, the analyzing module (114) of the system (100) is configured to analyze the output of the executed one or more instances of the validation to determine a probability of failure of each instance of validation. It would be appreciated that the recorded repository of historical results of execution of one or more instances of validation is used to determine the probability of failure of each instance of validation. Further, the probability of failure can be determined by using a random forest, logistic regression, decision tree or simple probability computation.

In the preferred embodiment of the disclosure, the calculation module (116) of the system (100) is configured to calculate an exposure value for each executed instance of validation, wherein the calculated exposure value is product of the probability of failure and Impact of the failure of each executed instance of validation. It is to be noted that a value impact of ingesting erroneous data is a predefined value. This value may range 1 to 10, where 1 may represent least or no impact and 10 represents higher impact. This value is arrived at by carrying out scan across the data warehouse system for the data field in question and them assigning a value between 1 to 10, proportional to number of instances of usage of the data field.

In the preferred embodiment of the disclosure, the optimization module (118) of the system (100) is configured to optimize the plurality of validations carried out for the input data at a data warehouse using the exposure value for each executed instance of validation with a predefined maximum threshold value of exposure. It is to be noted that the system is enabled to take decision for which one or more instances the validation can be turned off based on the calculated exposure value of execution. If the calculated exposure value is lesser than the predefined threshold value, the system will turn off the execution for the corresponding instance of validation. It would be appreciated that the optimization (effectively minimizing) has nothing to do with deletion of any data field as a configuration item but it is to minimize or reduce the times of validation it goes through.

Referring FIG. 2, a processor-implemented method (200) to optimize a plurality of validations carried out for input data at a data warehouse. The method comprises one or more steps as follows. Initially, it receives the input data to the warehouse. It selects at least one data field of the data warehouse using a data dictionary of the data warehouse to load the received input data.

Initially, at the step (202), input data is received at a receiving module of the system. It is to be noted that the received input data comprising one or more data files and each file comprises a series of data fields.

In the preferred embodiment of the disclosure, at the next step (204), at least one data field of the data warehouse is selected at a selection module (106) of the system (100) using a data dictionary of the data warehouse to load the received input data.

In the preferred embodiment of the disclosure, at the next step (206), determining an usage of the selected at least one field of the warehouse at a determining module (110) of the system (100) to determine an impact of the received input data being incorrect.

In the preferred embodiment of the disclosure, at the next step (208), executing one or more instances of a validation of the input data at an execution module (112) of the system (100) to the at least one selected data field of the warehouse. The output of each instance of execution is recorded continuously at a repository is also known as historical results of execution of one or more instances of validation.

In the preferred embodiment of the disclosure, at the next step (210), the output of the executed one or more instances of the validation is analyzed at an analyzing module (114) of the system (100) to determine a probability of failure of each instance of validation using the recorded repository of historical results of execution of one or more instances of validation.

In the preferred embodiment of the disclosure, at the next step (212), calculating an exposure value for each executed instance of validation at a calculation module (116) of the system (100). It would be appreciated that the calculated exposure value for each executed instance of validation is product of the probability of failure and Impact the failure of each executed instance of validation.

In the preferred embodiment of the disclosure, at the last step (214), optimizing the plurality of validations carried out for input data at a data warehouse at an optimization module (118) of the system (100) using the exposure value for each executed instance of validation with a predefined maximum threshold value of exposure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of consumption of resources to process or validate input data, which increases with increase in volume and velocity of the incoming data. This consumption of resources may increase in cost of computation and add to the cost of operations for enterprises. The time taken in validations also increases with increase in volume and velocity of incoming data. And the increase in time also adds to poor performance of the system in operation for users who are waiting to see results of ETL programs. Therefore, the abovementioned disclosure provides a system and method for optimizing a plurality of validations carried out for input data at a data warehouse.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer; or the like, or any combination thereof. The device may also include means which could be e.g. hardware means like e.g, an application-specific integrated circuit (ASIC), a field-programmable gate array (FPGA), or a combination of hardware and software means, e.g, an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processors) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for optimizing a plurality of validations carried out for input data at a data warehouse, wherein the system comprising:
   at least one memory storing a plurality of instructions;
   one or more hardware processors communicatively coupled with the at least one memory, wherein the one or more hardware processors are configured to execute one or more modules;
   a receiving module coupled to the one or more hardware processors, configured to receive the input data at the data warehouse, wherein the input data comprises one or more data files and each file contains series of data fields each with different characteristics and a business requirement;
   a selection module coupled to the one or more hardware processors, configured to select at least one data field of the series of data fields using a data dictionary of the data warehouse to load the received input data;
   a determining module coupled to the one or more hardware processors, configured to determine a usage of the selected at least one data field of the data warehouse to determine an impact of the received input data being incorrect;
   an execution module coupled to the one or more hardware processors, configured to execute one or more instances of a validation of the input data to the at least one selected data field of the data warehouse, wherein an output of each instance of execution is recorded continuously at a repository as historical results of execution of the one or more instances of validation and the execution module configured to implement an extract, transform, and load workflow for the one or more instances of the validation, wherein actual execution of validation is conditional based on a switch that is turned on or turned off and the extract, transform and load workflow progresses with validation turned on for a predefined period of time;
   an analyzing module coupled to the one or more hardware processors, configured to analyze the output of the executed one or more instances of the validation to determine a probability of failure of each instance of validation using recorded repository of the historical results of execution of the one or more instances of validation;
   a calculation module coupled to the one or more hardware processors, configured to calculate an exposure value for each executed instance of validation, wherein the calculated exposure value is a product of probability of failure and an impact of the failure of each executed instance of validation, and wherein the impact of the failure of each executed instance of validation is a value obtained by scanning the data warehouse for the selected at least one data field and assigning a value between 1 to 10, proportional to number of instances of usage of the selected at least one data field, wherein the one or more hardware processors are configured for decision making for the one or more instances when the validation is turned off based on calculated exposure value of execution; and
   an optimizing module coupled to the one or more hardware processors, configured to optimize the plurality of validations carried out for the input data at the data warehouse by comparing the calculated exposure value for each executed instance of validation with a predefined maximum threshold value of exposure, wherein when the calculated exposure value for an executed instance of validation is less than the predefined maximum threshold value, the execution for the corresponding instance of validation is turned off, such that the number of times the corresponding instance is validated is minimized.

2. The system as claimed in claim 1, wherein the plurality of validations comprising at least one mandatory data field of the data warehouse.

3. The system as claimed in claim 1, wherein the at least one data field depend on the business requirement like name, gender, physical address, communicating address, country, date of birth, citizenship and annual salary of an employee in an organization.

4. The system as claimed in claim 1, wherein the execution of the one or more instances of the validation of the input data is continued for a predefined counts.

5. A processor-implemented method for optimizing a plurality of validations carried out for input data at a data warehouse, the method comprising:

receiving, at a receiving module, the input data at the data warehouse, wherein the input data comprises one or more data files and each file comprises a series of data fields each with different characteristics and a business requirement;

selecting, at a selection module, at least one data field of the series of data fields using a data dictionary of the data warehouse to load the received input data;

determining, at a determining module, a usage of the selected at least one data field of the data warehouse to determine an impact of the received input data being incorrect;

executing, at an execution module, one or more instances of a validation of the input data to the at least one selected data field of the data warehouse, wherein an output of each instance of execution is recorded continuously at a repository as historical results of execution of the one or more instances of validation, and implementing an extract, transform, and load workflow for the one or more instances of the validation, wherein actual execution of validation is conditional based on a switch that is turned on or turned off and the extract, transform and load workflow progresses with validation turned on for a predefined period of time;

analyzing, at an analyzing module, the output of the executed one or more instances of the validation to determine a probability of failure in each instance of validation using recorded repository of historical results of execution of the one or more instances of validation;

calculating, at a calculation module, an exposure value for each executed instance of validation, wherein the calculated exposure value is a product of probability of failure and an impact of the failure of each executed instance of validation, and wherein the impact of the failure of each executed instance of validation is a value obtained by scanning the data warehouse for the selected at least one data field and assigning a value between 1 to 10, proportional to number of instances of usage of the selected at least one data field, and enabling decision-making for the one or more instances when the validation is turned off based on calculated exposure value of execution, and wherein if the calculated exposure value is lesser than a predefined threshold value then execution is turned off for a corresponding instance of validation; and optimizing, at an optimizing module, the plurality of validations carried out for the input data at the data warehouse by comparing the calculated exposure value for each executed instance of validation with a predefined maximum threshold value of exposure, wherein when the calculated exposure value for an executed instance of validation is less than the predefined maximum threshold value, the execution for the corresponding instance of validation is turned off, such that the number of times the corresponding instance is validated is minimized.

6. The method as claimed in claim 5, wherein the plurality of validations comprising at least one mandatory data field of the data warehouse.

7. The method as claimed in claim 5, wherein the at least one data field depend on the business requirement like name, gender, physical address, communicating address, country, date of birth, citizenship and annual salary of an employee in an organization.

8. The method as claimed in claim 5, wherein the execution of one or more instances of the validation of the input data is continued for a predefined counts.

* * * * *